United States Patent [19]

Cowardin et al.

[11] B 3,983,389

[45] Sept. 28, 1976

[54] WAND FOR READING OPTICALLY ENCODED GRAPHIC SYMBOLS

[75] Inventors: Robert L. Cowardin, Cary; George J. Laurer, Raleigh, both of N.C.

[73] Assignee: International Business Machines Corporation, Armonk, N.Y.

[22] Filed: Apr. 11, 1975

[21] Appl. No.: 560,765

[44] Published under the second Trial Voluntary Protest Program on February 3, 1976 as document No. B 560,765.

[52] U.S. Cl. .............................. 250/227; 350/96 C
[51] Int. Cl.² ........................................... G02B 5/14
[58] Field of Search ........... 250/566, 568, 227, 239; 235/61.11 E; 350/96 WG, 96 C, 96 B; 340/146.35 Y

[56] References Cited
UNITED STATES PATENTS

| | | | |
|---|---|---|---|
| 3,497,701 | 2/1970 | Dalton | 250/227 |
| 3,826,900 | 7/1974 | Moellering | 250/568 |
| 3,834,391 | 9/1974 | Block | 350/96 C |
| 3,871,744 | 3/1975 | Bridger et al. | 350/96 WG |

*Primary Examiner*—Archie R. Borchelt
*Assistant Examiner*—D. C. Nelms
*Attorney, Agent, or Firm*—John B. Frisone

[57] ABSTRACT

A wand suitable for scanning the universal product code (UPC) symbol uses a light emitting diode for illuminating the symbol and a silicon photodetector for receiving the reflected energy. A single optical fiber is coupled to the diode and to a portion of a second single fiber for conducting narrow bandwidth visible light centered about 6,500 A to the terminus of the wand. The reflected light energy from the symbol when it is scanned by the wand is transmitted to the silicon photodetector via the said second single fiber which is also coupled to a third single fiber which conducts the reflected light energy to the silicon detector.

11 Claims, 4 Drawing Figures

U.S. Patent    Sept. 28, 1976    Sheet 2 of 2    3,983,389
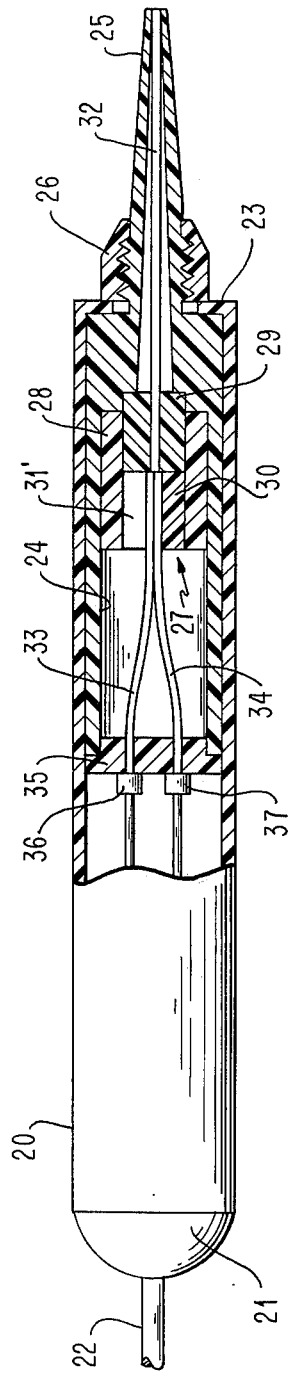
FIG. 2
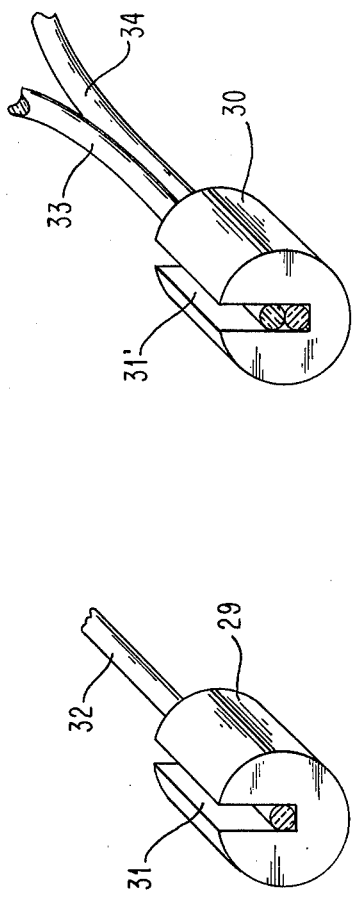
FIG. 3
FIG. 4

WAND FOR READING OPTICALLY ENCODED GRAPHIC SYMBOLS

FIELD OF THE INVENTION

The invention relates to scanning in general and more particularly to a wand suitable for optically scanning a graphic symbol such as the universal product code symbol.

DESCRIPTION OF THE PRIOR ART

Many hand-held optical wands for scanning graphically coded data have been built in the past and a description of these would be a major undertaking and of little value. One of the principle problems in the construction of a satisfactory hand-held wand is to provide sufficient light or illumination of the code bearing surface which is compatible with the reflective nature of the surface. In the case of the universal product code symbol, the symbol specification only guarantees sufficient contrast in a narrow band between approximately 6,000 and 7,000 A, thus a light source must contain sufficient energy within the range specified. In addition, electromagnetic energy outside this range should be eliminated. This may be accomplished by filtering. However, filtering techniques will reduce the light energy available in the desired range in those instances where broadband sources such as incandescent illumination are utilized.

A typical functional arrangement is illustrated in FIG. 1. The particular arrangement selected for FIG. 1 is entirely unsuitable as a solution and was selected since it illustrates not only the overall problem but the major problems encountered in the construction of a satisfactory wand for handscanning a graphic symbol such as the universal product code.

The optical system illustrated in FIG. 1 has a large number of inefficiencies which render it impractical. One, the collection angles L and B are small even in an optimum design situation. Two, the incandescent light source when provided with a filter produces insufficient illumination at the graphic symbol. Three, the lenses utilized in this system introduce additional loss of signal strength. Four, at any point other than the focal point of the lens system, the detector is not examining the illuminated spot. Five, the aperture in the end of a wand structure when such is provided will fill with debris and render the device inoperative. If the aperture is protected, additional illumination losses will be incurred. Sixth, and probably the most important deficiency is the cost and difficulty of manufacture and assembly.

SUMMARY OF THE INVENTION

The invention contemplates a wand for scanning a graphic symbol such as the UPC symbol which includes a light emitting diode light source which emits light primarily in the frequencies between 6,000 and 7,000 A. A single filament light conductor coupled to the light source and to a second single filament light conductor for conveying the emitted light to the free end or terminus of the said second filament. A third filament optically connected to the said second filament for receiving reflected light from the free end thereof and a silicon solid state detector connected to receive reflected light from the said third filament. A structure is provided for joining and securely holding the three filaments within a wand body which supports in addition to the three filaments, the light source and the detector.

BRIEF DESCRIPTION OF THE DRAWINGS

FIG. 2 is a cross-sectional view of a wand constructed in accordance with the invention; and FIGS. 3 and 4 are perspective view of the elements illustrated in cross-section in FIG. 2 which are used for joining the three fibers forming the optical transmission system.

DESCRIPTION OF THE PREFERRED EMBODIMENT

Figure 1:
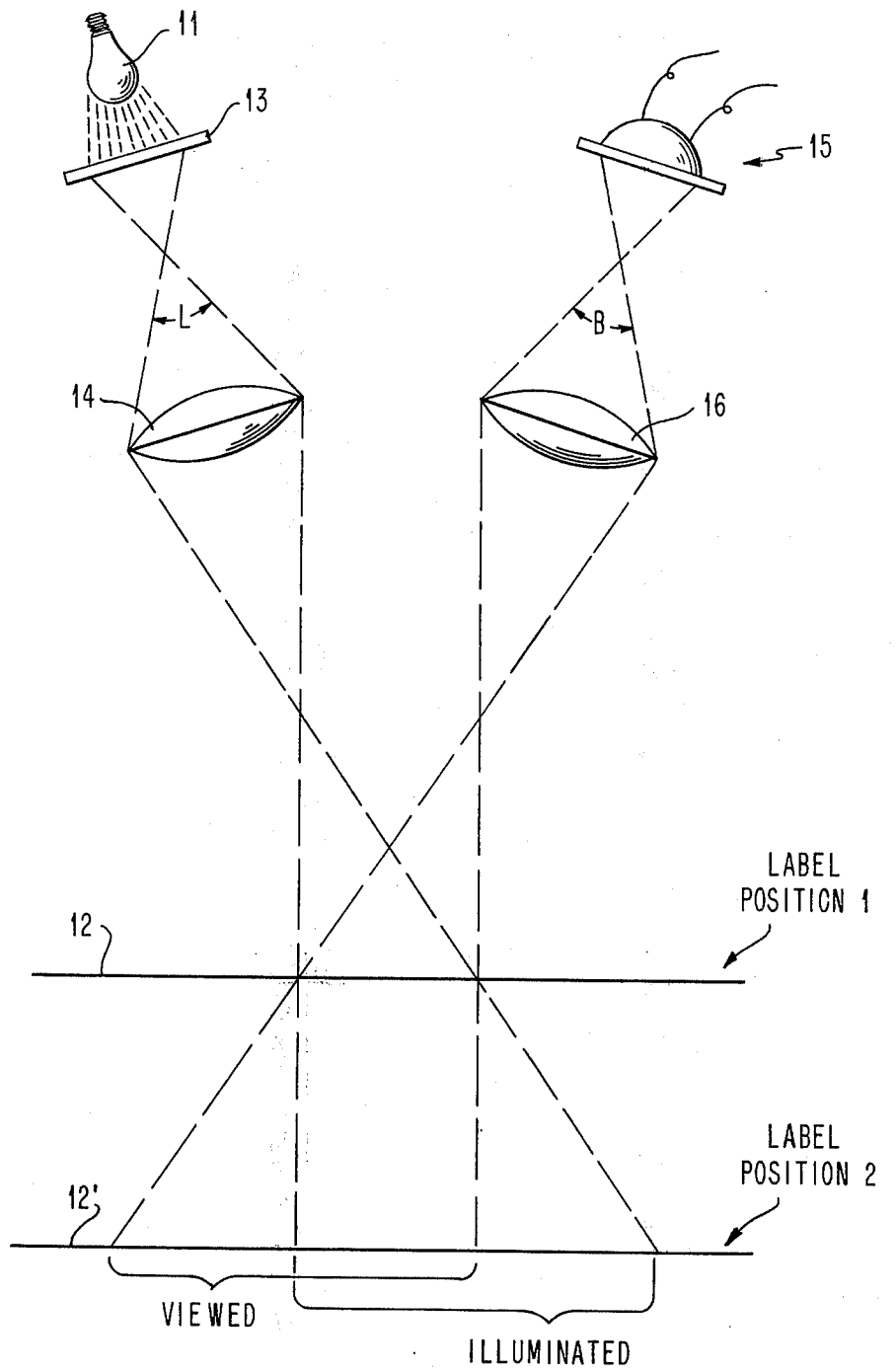
FIG. 1 is a schematic diagram of an optical system useful in a wand for handscanning of a graphic symbol such as the UPC symbol. This prior art diagram is provided for illustrating the problems inherent in the design of a suitable wand.

In the typical prior art system illustrated in FIG. 1, an incandescent light source 11 illuminates the label 12 or 12' shown in two positions via a filter 13 and a lens 14. The light reflected from the label 12 or 12' is directed onto a detector 15 via a second lens 16. The two positions for label 12 are shown to illustrate that except for the focal plane, the illuminated and viewed images differ, with a variable the problem of scanning or restricting the altitude at which the wand may be utilized efficiently. The altitude will, of course, be affected by the tilt angle; that is, the angle which the wand structure makes to the surface containing the coded label or graphically coded indicia. This structure contains all of the limitations on performance set forth above. It is illustrated here to show the problems associated with the implementation of a successful wand. In addition to the operating problems, the structure is difficult to manufacture since it contains lenses, filters and sources which must be precisely located and rigidly supported in order to function properly.

A wand constructed in accordance with the invention is illustrated in cross-section in FIG. 2. The cylindrical housing 20 shown partially in cross-section and an end cap 21 having an opening therein for the passage of a cable 22 containing the electrical conductors forms the basic pen body. Housing 20 is generally cylindrical and is provided with an end wall 23 having a centrally located opening. A second generally cylindrical member 24 having a conical portion 25 is supported within the housing 20 and the conical portion 25 protrudes through the central opening in the end wall 23 of housing 20. A nut 26 engages threads formed on the exterior surface of the conical portion 25 and clamps the member 24 against the inner surface of the end wall 23 when the nut 26 is threaded onto the conical portion 25.

A subassembly 27 is retained within a cylindical opening in member 24 and is located interiorally of the housing 20. The subassembly 27 includes a cylindrical support 28 which has an outer diameter substantially equal to the inner diameter of member 24. Mounted within cylindrical support 28 are two cylindrical retainers 29 and 30, illustrated in greater detail in FIGS. 3 and 4, respectively. Cylindrical retainer 29 protrudes beyond support 28 and engages a clearance within member 24. All of the parts with the exception of the attachment of member 24 via the nut 26 are secured together by epoxy-cementing. The assembly procedure will be described below.

Retainer 29 illustrated in FIG. 3 is cylindrical in nature and is provided with a cutout 31 having a width substantially equal to the diameter of a single optical fiber 32. The depth of the cutout is such that the center of the fiber when inserted in the cutout will fall at the center of the cylindrical retainer 29. The fiber 32 is inserted in the cutout 31 and cemented in place and trimmed to coincide with the flat surface illustrated in FIG. 3 by any convenient cutting tool and extends through an opening within the conical portion 25 to the terminus thereof as illustrated in FIG. 2.

Retainer 30, illustrated in FIG. 4, is similar to retainer 29 illustrated in FIG. 3 and is generally cylindrical in nature and includes a clearance cutout 31' which locates and supports two optical fiber strands 33 and 34. The depth of the cutout 31' is such that the tangent point or contact point of fibers 33 and 34 is located at the center of the cylindrical retainer 30. The fibers 33 and 34 are secured by cementing into the cutout 31' formed in the cylindrical retainer 30 and are trimmed flush with the surface visible in the drawings, especially FIG. 4. Fibers 33 and 34 are inserted in holes provided in an end cap 35 illustrated in FIG. 2. The fibers extend as far as the outer surface of end cap 32 where a light emitting diode 36 is cemented in contact with the end of fiber 33 and a silicon detector 37 is cemented into contact with the end of fiber 34. The cement or epoxy used will preferably match the index of refraction between the fiber ends and the light source and detector, respectively. The conductors from the light emitting diode 36 and the silicon photodetector 37 are carried out via cable 22 to a utilization device which may include an appropriate power source and detector. When light emitting diode 36 is energized, light energy is conducted via fiber 33 and fiber 32 to illuminate a graphic symbol over which the wand is being scanned. The reflected light from the symbol passes up fiber 32 and through fiber 34 where it is detected by silicon photodetector 37. The detected light causes electrical signals to be passed via the conductors in cable 22 back to the utilization device.

In assembly of the wand, the fibers 32, 33 and 34 are attached to the cylindrical retainers 29 and 30 by use of epoxy-cement. The retainers 29 and 30 are inserted into the cylindrical support 28 and cemented in place as illustrated in FIG. 2. The cement or epoxy used should preferably match the index of refraction of the butt joined fiber ends of fibers 32, 33 and 34. This assembly is then inserted into cylindrical member 24 and cemented in place. The fiber 32 is during this operation inserted through the interior opening in the conically shaped portion 25 and trimmed to terminate at the terminus of the conical portion 25. The fibers 33 and 34 are inserted in the appropriate holes in end cap 35 and attached by epoxycement to the LED 36 and silicone photodetector 37 which are at the same time cemented to cap 35. This entire assembly is inserted into the housing 20 and locked in place by nut 26. The cable 22 is attached to the LED 36 and silicon detector 37 and the end cap 21 is attached to the body of the wand 20 by any convenient means such as threads or friction fit.

It should be apparent from the above description that the wand described provides an efficient light conducting system which utilizes efficiently the low energy limited light from the light emitting diode 36 and is in addition easily and accurately assembled to provide an extremely inexpensive and rugged wand for scanning optically encoded graphic symbols. The optical design is such that the wand will operate over a wide skew angle from the perpendicular and should provide satisfactory results up to and beyond 35° off of the perpendicular when held in contact with a graphic symbol imprinted on a package or other device.

When 10 mil fibers are used for the optical fibers 32, 33 and 34, the wand is capable of resolving bars or spaces as narrow as 8 mils in width with less than a 5% change in modulation when reading 16 mil bars or spaces, thus the wand is eminently suitable for reading the UPC symbol. In addition, the termination in conical member 25 of the fiber 32 introduces no additional loss and when made flush with the end of conical member 25 introduces no additional losses while preventing an accumulation of debris or trash which may result in a loss of reflected light intensity. The wand utilizes no lenses and associated light losses concomitant with their use. It is simple in manufacture, requires no critical adjustments yet it provides a superior level of performance and is capable because of its construction of withstanding hard use and hostile environments.

While the invention has been particularly shown and described with reference to a preferred embodiment thereof, it will be understood by those skilled in the art that various changes in form and details may be made therein without departing from the spirit and scope of the invention.

What is claimed is:

1. A wand suitable for scanning graphically encoded indicia and providing electric signals which are an analog of the graphically encoded indicia comprising:
   first, second and third substantially cylindrical optically conductive fibers;
   a first retainer including means for locating said first and second fibers with respect to a reference dimension of said first retainer such that the said first and second fibers are in contact along a line which includes common tangent points on the substantially cylindrical surfaces of the fibers and the line of contact is coincident with the said reference dimension;
   a second retainer including means for locating said third fiber with respect to a reference dimension substantially identical to the first retainer such that the axis of the cylindrical third fiber is coincident with the said reference dimension;
   a support for supporting said first and second retainers in juxtaposition such that the said respective reference dimensions are in alignment whereby the point of tangency of the said first and second fiber coincides with the axis of the said third fiber;
   a housing for retaining said support, positioning said third fiber in a substantially elongated position, supporting a light source and a photodetector; and
   means for connecting the free end of the first and second fibers to the light source and the photodetector, respectively.

2. A wand as set forth in claim 1 in which said first and second retainers have a substantially cylindrical surface and the said reference dimensions are the cylindrical axis, and
   said support for supporting said first and second retainers includes a substantially cylindrical opening for receiving and supporting the said retainers and maintaining their axes colinear.

3. A wand as set forth in claim 2 in which a refractive index matching material is inserted between the juxtaposed surfaces of the said first and second retainers.

4. A wand as set forth in claim 3 in which said refractive index matching material is an epoxy cement which in addition to matching the index of refractions between the fibers retained secures the first and second retainers.

5. A wand as set forth in claim 2 in which said locating means in the first retainer includes an axially extending opening through the first retainer having surfaces which locate the tangential contact line of the first and second fibers along the axis of the first retainer, and said locating means in the second retainer includes an axially extending opening through the second retainer having surfaces which locate the axis of the third fiber along the axis of the second retainer.

6. A wand as set forth in claim 5 in which a refractive index matching material is inserted between the juxtaposed surfaces of the said first and second retainers.

7. A wand as set forth in claim 6 in which said refractive index matching material is an epoxy cement which in addition to matching the index of refraction between the retained fibers in the first and second retainers secures the said first and second retainers to each other.

8. A wand as set forth in claim 2 in which said means for connecting the free end of the first and second fibers to the light source and the photodetectors, respectively, includes:

a substantially cylindrical end support mounted on said support for said retainers and spaced from said first retainer;

said support including a first clearance opening for receiving said first fiber, means for attaching the free end of said first fiber to the said light source and the light source to the end support, a second clearance opening for receiving said second fiber and means for attaching the free end of said second fiber to the said photodetector and the photodetector to the end support.

9. A wand as set forth in claim 8 in which both said attaching means is an epoxy cement which matches the index of refraction between the first and second free fiber ends and the light source and photodetector, respectively.

10. A wand as set forth in claim 5 in which said means for connecting the free end of the first and second fibers to the light source and the photodetectors, respectively, includes:

a substantially cylindrical end support mounted on said support for said retainers and spaced from said first retainer;

said support including a first clearance opening for receiving said first fiber, means for attaching the free end of said first fiber to the said light source and the light source to the end support, a second clearance opening for receiving said second fiber and means for attaching the free end of said second fiber to the said photodetector and the photodetector to the end support.

11. A wand as set forth in claim 10 in which both said attaching means is an epoxy cement which matches the index of refraction between the first and second free fiber ends and the light source and photodetector, respectively.

* * * * *